US007331861B2

(12) United States Patent
Nordman

(10) Patent No.: US 7,331,861 B2
(45) **Date of Patent: *Feb. 19, 2008**

(54) GAMING DEVICE HAVING DISPLAY WITH CONCENTRICALLY ROTATING AND TRANSLATING INDICATOR THEREFORE

(75) Inventor: Dennis Nordman, Lake Villa, IL (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,662

(22) Filed: Jun. 15, 2005

(65) Prior Publication Data

US 2005/0266913 A1 Dec. 1, 2005

Related U.S. Application Data

(63) Continuation of application No. 10/659,864, filed on Sep. 10, 2003, now Pat. No. 6,974,129.

(51) Int. Cl.
*A63F 13/00* (2006.01)

(52) U.S. Cl. .......................................................... 463/16

(58) Field of Classification Search .................. 463/16, 463/20, 30; 273/143 R, 138.1
See application file for complete search history.

(56) References Cited

U.S. PATENT DOCUMENTS 4,410,178 A 10/1983 Partridge
4,695,053 A 9/1987 Vazquez, Jr. et al.
4,732,386 A 3/1988 Rayfiel
5,058,893 A 10/1991 Bertram et al.
5,152,529 A 10/1992 Okada
5,364,100 A 11/1994 Ludlow et al.
5,395,111 A 3/1995 Inoue
5,449,173 A 9/1995 Thomas et al.
5,560,603 A 10/1996 Seelig et al.
5,584,763 A 12/1996 Kelly et al.

(Continued)

FOREIGN PATENT DOCUMENTS

DE 273 284 2/1979

(Continued)

OTHER PUBLICATIONS

4DU Dice Unit Advertisement written by starpoint.uk.com, printed on Sep. 3, 2002.

(Continued)

*Primary Examiner*—Kim Nguyen
(74) *Attorney, Agent, or Firm*—Bell, Boyd & Lloyd LLP

(57) ABSTRACT

A display device for a gaming device which includes concentric rotating displays, wherein an outer one of the displays is also operable to translate with respect to an inner one of the displays. The inner display includes multiple rows of symbols. The outer display includes multiple indicating viewing areas. Each of the viewing areas is also associated with a symbol. When the displays eventually stop, one of the viewing areas that is positioned furthest most towards the front of the machine enables one of the symbols of the first display to be seen by the player. That symbol is made part of an outcome from the sequence in combination with the symbol of the second display associated with the viewing area that indicates the symbol of the first display.

17 Claims, 5 Drawing Sheets

U.S. PATENT DOCUMENTS

| | | | |
|---|---|---|---|
| 5,584,764 | A | 12/1996 | Inoue |
| 5,609,524 | A | 3/1997 | Inoue |
| 5,622,366 | A | 4/1997 | Inoue |
| 5,664,998 | A | 9/1997 | Seelig et al. |
| 5,722,891 | A | 3/1998 | Inoue |
| 5,743,526 | A | 4/1998 | Inoue |
| 5,752,881 | A | 5/1998 | Inoue |
| 5,823,872 | A | 10/1998 | Prather et al. |
| 5,823,874 | A | 10/1998 | Adams et al. |
| 5,848,932 | A | 12/1998 | Adams |
| 5,863,249 | A | 1/1999 | Inoue |
| D406,865 | S | 3/1999 | Heidel |
| 5,882,261 | A | 3/1999 | Adams |
| 5,885,157 | A | 3/1999 | Harada et al. |
| 5,911,418 | A | 6/1999 | Adams et al. |
| 5,927,714 | A | 7/1999 | Kaplan |
| 5,976,015 | A | 11/1999 | Seelig et al. |
| 5,984,782 | A | 11/1999 | Inoue |
| 6,004,207 | A | 12/1999 | Wilson, Jr. et al. |
| 6,039,649 | A | 3/2000 | Schulze |
| 6,059,658 | A | 5/2000 | Mangano et al. |
| 6,062,979 | A | 5/2000 | Inoue |
| 6,086,066 | A | 7/2000 | Takeuchi et al. |
| 6,089,977 | A | 7/2000 | Bennett |
| 6,089,978 | A | 7/2000 | Adams et al. |
| 6,105,962 | A | 8/2000 | Malavazos et al. |
| 6,113,098 | A | 9/2000 | Adams |
| 6,142,873 | A | 11/2000 | Weiss et al. |
| 6,142,874 | A | 11/2000 | Kodachi et al. |
| 6,159,098 | A | 12/2000 | Slomiany et al. |
| 6,162,121 | A | 12/2000 | Morro et al. |
| 6,173,955 | B1 | 1/2001 | Perrie et al. |
| 6,203,429 | B1 | 3/2001 | Demar et al. |
| D441,031 | S | 4/2001 | Seelig et al. |
| 6,213,876 | B1 | 4/2001 | Moore, Jr. |
| 6,220,593 | B1 | 4/2001 | Pierce et al. |
| 6,224,483 | B1 | 5/2001 | Mayeroff |
| 6,227,970 | B1 | 5/2001 | Shimizu et al. |
| D443,313 | S | 6/2001 | Brettschneider |
| 6,251,013 | B1 | 6/2001 | Bennett |
| 6,254,481 | B1 | 7/2001 | Jaffe |
| 6,267,669 | B1 | 7/2001 | Luciano, Jr. et al. |
| 6,270,411 | B1 | 8/2001 | Gura et al. |
| 6,302,790 | B1 | 10/2001 | Brossard |
| 6,305,686 | B1 | 10/2001 | Perrie et al. |
| 6,315,663 | B1 | 11/2001 | Sakamoto |
| 6,336,863 | B1 | 1/2002 | Baerlocher et al. |
| 6,340,158 | B2 | 1/2002 | Pierce et al. |
| 6,368,216 | B1 | 4/2002 | Hedrick et al. |
| 6,386,974 | B1 | 5/2002 | Adams |
| 6,398,220 | B1 | 6/2002 | Inoue |
| 6,419,579 | B1 | 7/2002 | Bennett |
| 6,461,241 | B1 | 10/2002 | Webb et al. |
| D465,531 | S | 11/2002 | Luciano, Jr. et al. |
| 6,481,713 | B2 | 11/2002 | Perrie et al. |
| 6,533,660 | B2 | 3/2003 | Seelig et al. |
| 6,537,152 | B2 | 3/2003 | Seelig et al. |
| 6,582,307 | B2 | 6/2003 | Webb |
| 6,609,972 | B2 | 8/2003 | Seelig et al. |
| 6,712,694 | B1 | 3/2004 | Nordman |
| 6,715,756 | B2 | 4/2004 | Inoue |
| 6,974,129 | B2 * | 12/2005 | Nordman ................ 273/143 R |
| 2001/0024971 | A1 | 9/2001 | Brossard |
| 2002/0094861 | A1 | 7/2002 | Seelig et al. |
| 2002/0094862 | A1 | 7/2002 | Inoue |
| 2002/0142829 | A1 | 10/2002 | Inoue |
| 2003/0078089 | A1 | 4/2003 | Gray et al. |
| 2003/0232643 | A1 | 12/2003 | Inoue |
| 2004/0000754 | A1 | 1/2004 | Inoue |
| 2004/0012145 | A1 | 1/2004 | Inoue |
| 2004/0014516 | A1 | 1/2004 | Inoue |
| 2004/0014517 | A1 | 1/2004 | Inoue |
| 2004/0017041 | A1 | 1/2004 | Inoue |
| 2004/0018866 | A1 | 1/2004 | Inoue |
| 2004/0026854 | A1 | 2/2004 | Inoue |
| 2004/0036218 | A1 * | 2/2004 | Inoue ......................... 273/292 |
| 2004/0038726 | A1 | 2/2004 | Inoue |
| 2004/0041340 | A1 | 3/2004 | Inoue |
| 2004/0150161 | A1 | 8/2004 | Inoue |
| 2004/0155399 | A1 | 8/2004 | Inoue |
| 2004/0183251 | A1 | 9/2004 | Inoue |
| 2005/0054422 | A1 * | 3/2005 | Rothkranz et al. ............ 463/20 |

FOREIGN PATENT DOCUMENTS

| | | | |
|---|---|---|---|
| DE | 31 05 266 | A1 | 9/1982 |
| DE | 31 05 266 | C2 | 9/1982 |
| EP | 0 065 404 | | 11/1982 |
| EP | 0 410 789 | | 1/1991 |
| EP | 1003138 | A | 5/2000 |
| GB | 912685 | | 12/1962 |
| GB | 2098780 | A | 11/1982 |
| GB | 2201821 | A | 9/1987 |
| JP | 2002-320703 | | 11/2002 |
| JP | 2002320703 | A | 11/2002 |
| JP | 2004013148 | A | 1/2004 |

OTHER PUBLICATIONS

American Bandstand Brochure written by Anchor Games, published in 2001.

Bonus Roulette Brochure written by F. Franco, published prior to Sep. 11, 2003.

Bonus Roulette Brochure written by R. Franco, published prior to Sep. 11, 2003.

Cyberdyne Gaming Brochure written by Cyberdyne Gaming, published prior to Sep. 11, 2003.

Double Diamond Girls Advertisement, written by A.C. Coin and Slot Services Company, published prior to Sep. 11, 2003.

Elvira® Mistress of the Dark™ Advertisement written by IGT, published in 2002.

Elvis Hits Advertisement written by IGT, published in 1999.

Holy Smoke Brochure written by Impulse Gaming Ltd., published prior to Sep. 11, 2003.

Honeymooners Advertisement, written by AC Coin & Slot, published 2002.

Jack and the Beanstalk™ Brochure written by AC Coin & Slot, published prior to Sep. 11, 2003.

Lemons, Cherries and Bell-Fruit-Gum written by Richard M. Bueschel, pp. 39-41, 64, 70, 137, 149-150, 195-196 and 251, 1995.

Little Green Men Jr.™ Advertisement written by AC Coin & Slot, published prior to Sep. 11, 2003.

Little Green Men Jr.™ Article written by Strictly Slots, published in Feb. 2003.

Miss America Brochure written by AC Coin & Slot, published prior to Sep. 11, 2003.

Mix and Match Article written by Strictly Slots, published in Apr. 2002.

Mix and Match Advertisement published by AC Coin & Slot, published prior to Sep. 11, 2003.

Monster Match Game Description by Strictly Slots, published by AC Coin & Slots prior to Sep. 9, 2003.

Monster Match Advertisement by Strictly Slots, published prior to Sep. 9, 2003.

Monster Match Article, published by Strictly Slots, published in Jan. 2002.

Pick a Prize Brochure written by Acres Gaming Incorporated, published prior 2001.

R&B™ Brochure published by AC Coin & Slot, published prior to Sep. 11, 2003.

Royal Roulette Brochure written by Impulse Gaming Ltd., published prior to Sep. 11, 2003.

Slot Machine Buyer's Handbook, A Consumer's Guide to Slot Machines written by David L. Saul and Daniel R. Mead, published in 1998.

Silver City Roundup Brochure published by AC Coin & Slot, published prior to Sep. 11, 2003.
Slot Machines A Pictorial History of the First 100 Years, 5th edition written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Spin-A-Lot Brochure written by Acres Gaming Incorporated, published prior to 2001.

* cited by examiner

GAMING DEVICE HAVING DISPLAY WITH CONCENTRICALLY ROTATING AND TRANSLATING INDICATOR THEREFORE

PRIORITY CLAIM

This application is a continuation of, claims priority to and the benefit of U.S. patent application Ser. No. 10/659,864, filed Sep. 10, 2003, now issued as U.S. Pat. No. 6,974,129, the entire contents of which is incorporated herein.

BACKGROUND OF THE INVENTION

The present invention relates to gaming devices. More particularly, the present invention relates to wagering gaming device displays.

Gaming devices, such as slot machines and video poker machines, provide fun and excitement to the player. Gaming, in general, provides an escape from the everyday rigors of life. Gaming devices use bright lights and exciting sounds to set the gaming machines apart from other machines. Gaming devices, in particular, use one or more displays that enable the player to see and play the game. The displays typically portray the action of the game and ultimately indicate whether or not the player wins.

Slot machine and other gaming device displays have gone through a number of transitions since their inception. Originally, slot machines displayed purely mechanical reels. While these machines gained enormous popularity, the mechanical nature of the reels limited the number of paystops, which limited the number of different symbols and the number of different winning symbol combinations.

The advent of the computer and the video monitor expanded the possibilities for gaming devices. There are now video poker, video blackjack and other types of video gaming machines. Video displays have also been implemented in slot machines. The video slot machines use computers to randomly generate symbol combinations from an expanded number of different symbols. Video reel strips can include a virtually unlimited number of symbols, which enables a wide variety of different symbol combinations to be employed, including combinations that appear very infrequently and yield high payouts.

With slot machines, the video monitors have also been used to provide bonus or secondary games. Bonus games in gaming machines have become much more prevalent and elaborate in recent years. For example, players play the base game of slot until becoming eligible for a bonus game. The base game temporarily pauses, while the player plays the bonus game. When the player completes the bonus game, the gaming device returns the player to the bonus game.

It should therefore be appreciated that a single video monitor is often sufficient to provide both the base game of slot and one or more bonus games that become triggered by the slot game. As illustrated in FIG. 1B, there is room on the cabinet of gaming device 10*b* for an upper display area 32. This area, however, is often not utilized for gaming purposes and may simply provide a paytable, graphics and/or lettering that pertains to a theme of the gaming device.

Video monitors and in particular video-based slot machines are likely going to continue growing in popularity. As the video monitor has been used more and more, however, there has been a growing sentiment that some of the mystique of the old time mechanical gaming devices is lost when mechanical reels and mechanical displays are replaced by a video monitor.

Accordingly, a need exists to provide a gaming device that may use a video monitor, which provides increased flexibility to the gaming device to add more symbols and more elaborate bonus games, while providing some aspect of the gaming device that is mechanical and provides a fun and exciting mechanical display.

SUMMARY OF THE INVENTION

The present invention provides display device for a gaming device. The display device can be employed in a primary game or a secondary game of a gaming machine. The display device includes concentric rotating displays, wherein an outer one of the displays is also operable to translate with respect to an inner one of the displays. In alternative embodiments, the inner display translates with respect to the outer display, or both translate with respect to each other. The inner display includes multiple rows (or alternatively columns or groups) of symbols. The outer display includes multiple indicating apertures or viewing areas. Each of the apertures or viewing areas is also associated with a symbol. When the displays eventually stop, one of the apertures or viewing areas that is positioned furthest most towards the front of the machine enables one of the symbols of the first display to be seen by the player or otherwise indicates to the player. That symbol is used to determine an outcome from the sequence in combination with the symbol on the second display associated with the aperture, viewing area or indicator that indicates or designates the symbol on the first display.

The symbols represent various types of awards that the player can win, such as game credits, game credit multipliers, a number of free spins, a number of free games, a number of picks from a prize pool, an entry into a bonus game and/or any combination thereof. In one embodiment, therefore, the outcome of the display device is an award for the player.

The concentric displays operate together. The inner display, in one embodiment, includes an elongated cylinder having multiple rings or rows of displayed symbols, such as credits, multipliers, etc. The outer display includes a collar, in one embodiment, which covers at any one time the symbols from one of the rings of the inner display. The collar, however, defines apertures, windows or otherwise defines viewing areas or indicators that enable the player to see through the collar and view one of the symbols from the inner ring, which would otherwise be covered by the collar if not for the aperture window or other viewing area.

In the embodiment where the inner display is arranged to rotate about a vertical axis, the collar translates up and down with respect to the translationally stationary inner display. In that manner, while the collar spins so that the one or more viewing areas pass over different radial segments of the inner display, the translational movement of the collar also causes those viewing areas to cover different lengthwise or different longitudinal areas of the inner display.

The ultimate result is a fun and exciting motion control scheme that involves three separate motions in one embodiment, namely: (i) the rotation of the inner display; (ii) the rotation of the outer display or collar; and (iii) the translation of the outer display or collar. The sequential movement or stopping of these members can be controlled to build excitement for the player as one or more components are sequentially indicated in one embodiment.

The relative movement of the different displays can take different forms. That is, the inner display can move at the same time or at a different time than the outer display.

Alternatively, the outer display can move at the same time or at a different time than the inner display moves. The displays can move in the same direction, in opposite directions and in changing directions. The displays can move at different relative angular speeds. The displays can accelerate at different angular accelerations. Moreover, the translational movement can occur during any of the above variations in the relative rotational movement of the displays of the display device invention. That is, the outer display can translate while the outer display is rotating or stationary. The outer display can translate while the inner display is rotating or stationary.

The inner and outer displays of the display device are moved by multiple motion producing devices. In one embodiment, the motion producing devices are stepper motors that are highly accurate and programmably controlled motion producing devices. Stepper motors typically produce a rotational output, however, linear stepper motors are also available and contemplated for use with the display device of the present invention. The stepper motors operate with a motion control program that, in one embodiment, is triggered to produce a result that has been previously and randomly determined. In one embodiment that previously and randomly determined result is determined at a location remote from the gaming device. In any case, a processor of the gaming device accesses or is instructed to access such program and sends signals to one or more motion controllers that in turn send motor currents to the one or more stepper motors to produce motion. That motion control configuration enables a virtually unlimited amount of different sequences to be stored, which have virtually an unlimited amount of variability between the relative motion of the different motors, limited only by the torque/speed curves of such motors.

Ultimately, the displays come to a stop, with one of the viewing areas of the outer display or collar indicating or designating one of the symbols displayed in one of the rows of symbols of the inner display or cylinder. In one embodiment, the outer display includes multiple viewing areas, wherein the viewing area that counts in the end is the one that faces forward towards the player, i.e., is front most on the display device with respect to the other viewing areas. The viewing areas themselves are, in one embodiment, each associated with a second symbol, which is combined with the symbol ultimately indicated on the inner display by the outer display. For example, the inner display can show credit symbols while the viewing areas defined by the outer display are each associated with credit multipliers. In that manner, when the outer display stops moving and indicates one of the symbols of the inner display, that indicated inner symbol is then multiplied by the multiplier value associated with the indicating aperture of the outer display. That multiplication or product is provided to the player as an output. In one embodiment, the output is a number of credits that are transferred to the player's credit balance.

It is therefore an advantage of the present invention to provide a fun and exciting gaming device display.

It is another advantage of the present invention to provide a display device having multiple rotating parts, wherein one of such part translates.

Moreover, it is an advantage of the present invention to add a mechanical element to a video based gaming machine.

Still further, it is an advantage of the present invention to provide a bonus game or bonus display device that is operable with a multitude of different primary games.

Additional features and advantages of the present invention are described in, and will be apparent from, the following Detailed Description of the Invention and the figures.

DETAILED DESCRIPTION OF THE INVENTION

The present invention provides a display and display indicators that operate with a multitude of primary or base wagering games, including but not limited to the games of slot, poker, keno, blackjack, bunco and checkers. In an embodiment, the display and indicators operate in conjunction with secondary or bonus games, which in turn operate in conjunction with the above listed primary games. Besides such base and bonus games, the present invention can operate with any of the bonus triggering events, as well as any progressive game coordinating with these base games. The symbols and indicia used for any of the primary or base games, bonus or secondary games or progressive games include any suitable symbols, images or indicia.

Figure 1A:
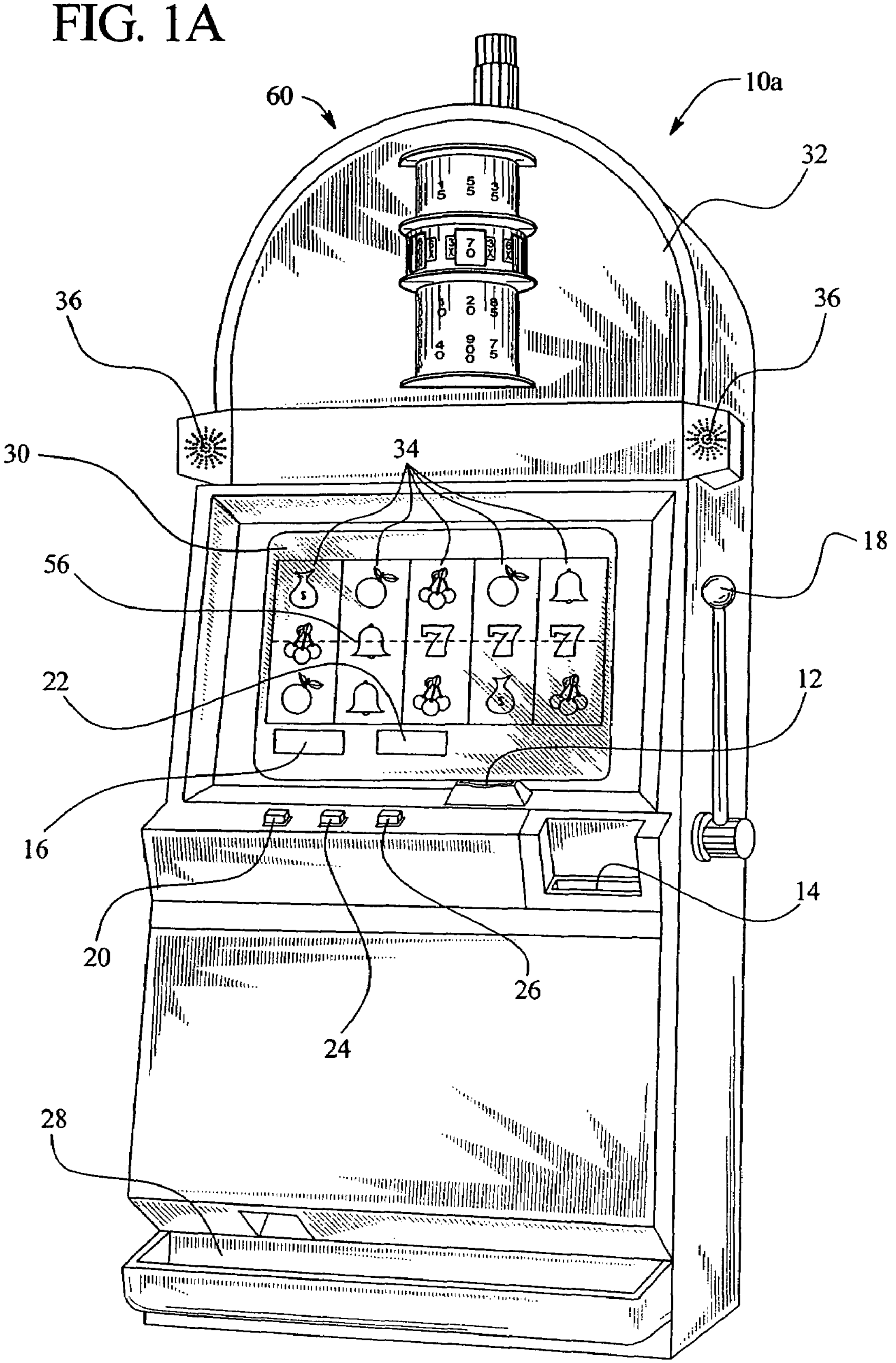
FIGS. 1A and 1B are perspective views of alternative embodiments of the gaming device of the present invention.
Figure 1B:
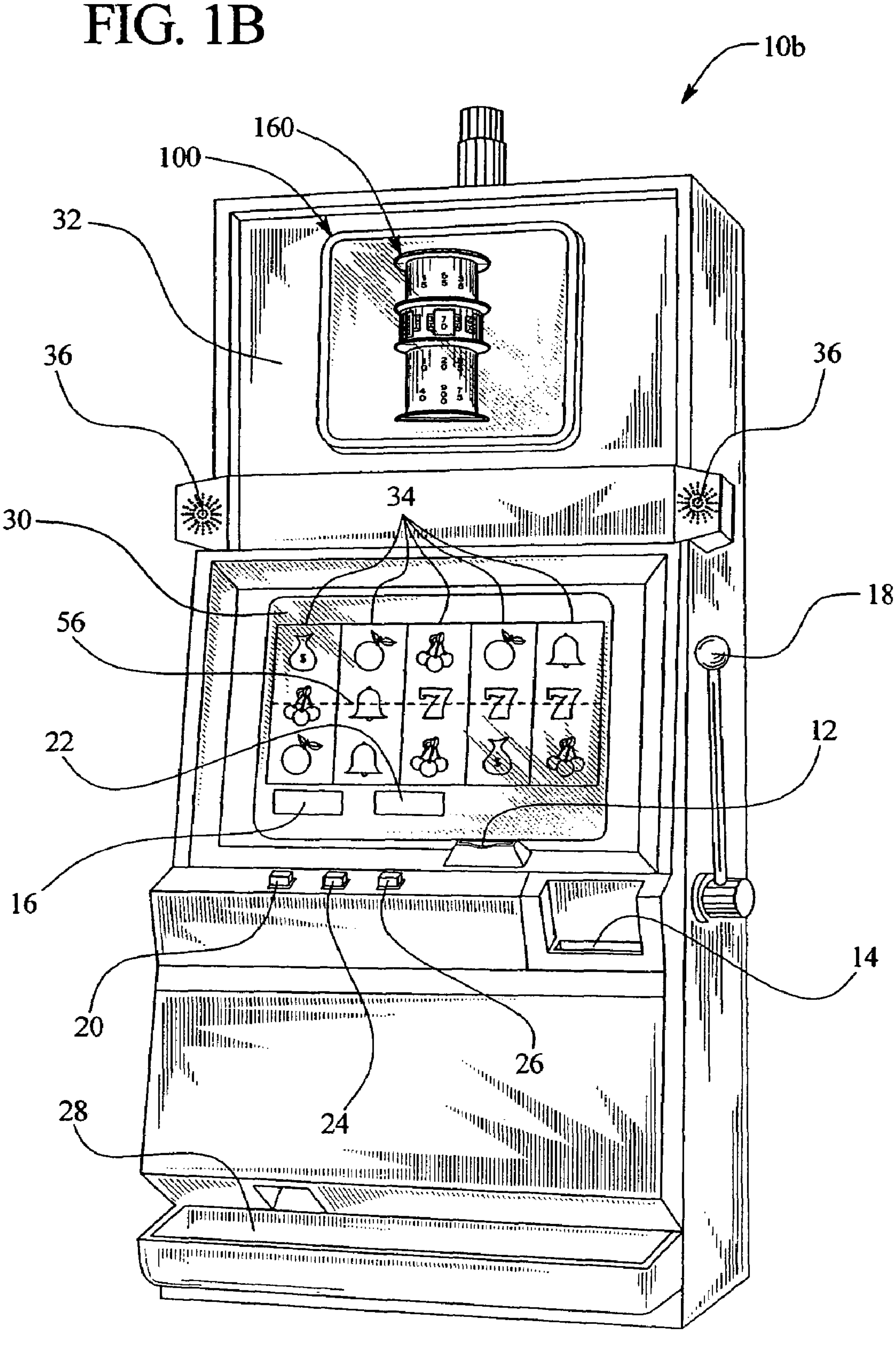

One primary embodiment for the display and display indicators is with a slot game. Referring now to the drawings, and in particular to FIGS. 1A and 1B, one slot machine embodiment is illustrated. Gaming devices 10*a* and 10*b* illustrate two possible cabinet styles and display arrangements and are collectively referred to herein as gaming device 10. Gaming device 10 is illustrated as having the controls, displays and features of a conventional slot machine, wherein the player operates the gaming device while standing or sitting. Gaming device 10 also includes being a pub-style or table-top game (not shown), which a player operates while sitting.

Gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiments shown in FIGS. 1A and 1B include a display device 30 and a cabinet having an upper display area 32. Display device 30 includes any viewing surface such as glass, a video monitor or screen, a liquid crystal display or any other static or dynamic display mechanism. In a video poker, blackjack or other card gaming machine embodiment, the display device includes the display of one or more cards. In a keno embodiment, the display device includes the display of numbers.

Display devices 60 and 160 of the present invention discussed below are provided, in an embodiment, in the upper display area 32 of the cabinets of gaming devices 10*a* and 10*b* of FIGS. 1A and 1B. Display devices 60 and 160 are provided, in another embodiment, on top of the rounded cabinet of gaming device 10*a* or rectangular cabinet of gaming device 10*b*. In a further embodiment, the top portion or top box of the gaming device is removed, creating a lower profile machine. Here, the display devices 60 and 160 sit on top of gaming device 10 but are lower to the ground than if the top box is not removed.

The slot machine embodiment of gaming device 10 includes a plurality of reels 34, for example three to five reels 34. Each reel 34 includes a plurality of indicia such as bells, hearts, fruits, numbers, letters, bars or other images which correspond to a theme associated with the gaming device 10. If the reels 34 are in video form, the display device displaying the video reels 34 is, in one embodiment, a video monitor. Gaming device 10 includes speakers 36 for making sounds or playing music.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 employs a video-based display device 30 for the bonus games. The bonus games include a program that automatically begins when the player achieves a qualifying condition in the base game.

Figure 2:
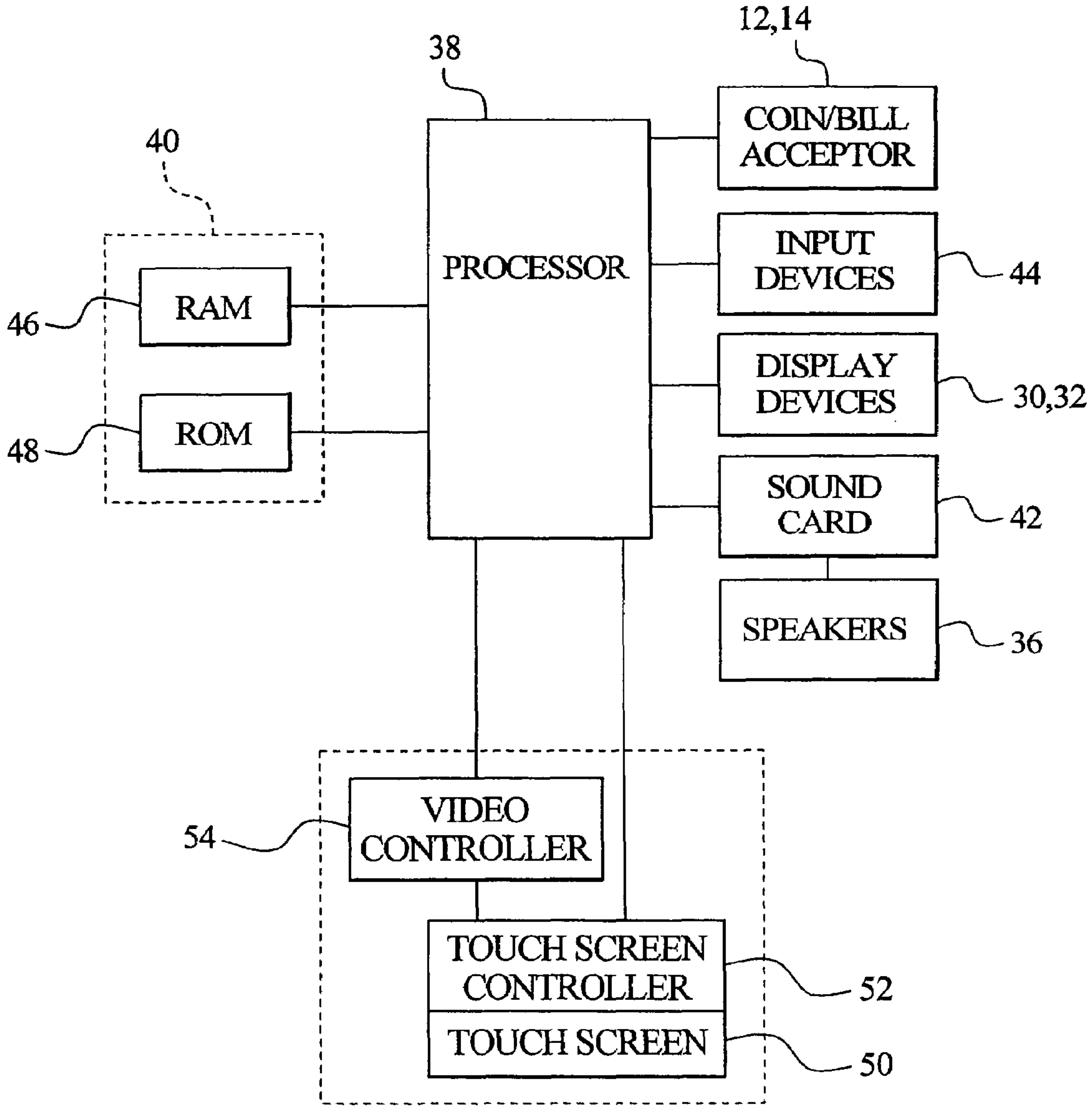
FIG. 2 is a schematic block diagram of the electronic configuration of one embodiment of the gaming device of the present invention.

Referring now to FIG. 2, one embodiment of an electronic configuration for gaming device 10 includes: a processor 38; a memory device 40 for storing program code or other data; a display device 30; a sound card 42; a plurality of speakers 36; and one or more input devices 44. The processor 38 is a microprocessor based platform that is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include the pull arm 18, play button 20, the bet one button 24, the cash out button 26 and other player inputs. A touch screen 50 and touch screen controller 52 are connected to a video controller 54 and processor 38. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money to start the game.

The processor 38 also controls the output of one of more motion controllers 56 that control one or more motion producing devices 58. The motion producing devices 58 can be any suitable combination of motors, stepper motors, linear stepper motors or other types of linear actuators. The motion controllers 56 typically include printed circuit boards or stand alone enclosures that receive high level commands from the processor 38. The motion controller 56 converts the high level commands, for example, into a number of step pulses, which in turn are converted into motor currents. The stepper motor or other type of motion producing device 58 receives the currents, wherein the currents cause, for example, a rotor to turn within a stator a precise and desired amount.

As described more fully below, the rotational motion of a motors 58 are used to rotate the display of the present invention. The rotational motion of one of the motors 58 is converted via a lead screw to cause one of the displays to translate additionally. Otherwise, a linear motion producing device 58 can be used to directly cause the display to translate additionally.

The motion control scheme facilitates complex movements of multiple parts to be programmed into the memory device 40 and carried out by the processor 38 at the appropriate time in the sequence of the game, be it a base, bonus, bonus triggering or progressive sequence of gaming device 10. The motion sequences are alternatively stored in the motion controllers 56. Moreover, multiple programs can be implemented in the memory device 40, wherein the processor runs the appropriate program at the appropriate time, and wherein the members and indicators described below can perform or move differently, e.g., faster, slower or in different directions at different times, at different points in the game and in different sequences.

The motion control programs, in an embodiment, interface with one or more random generation devices, typically software based items, to produce randomly displayed outcomes on the displays and indicators of the present invention. For example, the processor runs a random selection sequence to receive a result and then commands that a particular motion control program be run to achieve the result. The random result is therefore determined, in one embodiment, before or during the actual movement of the members and indicator(s).

Figure 3:
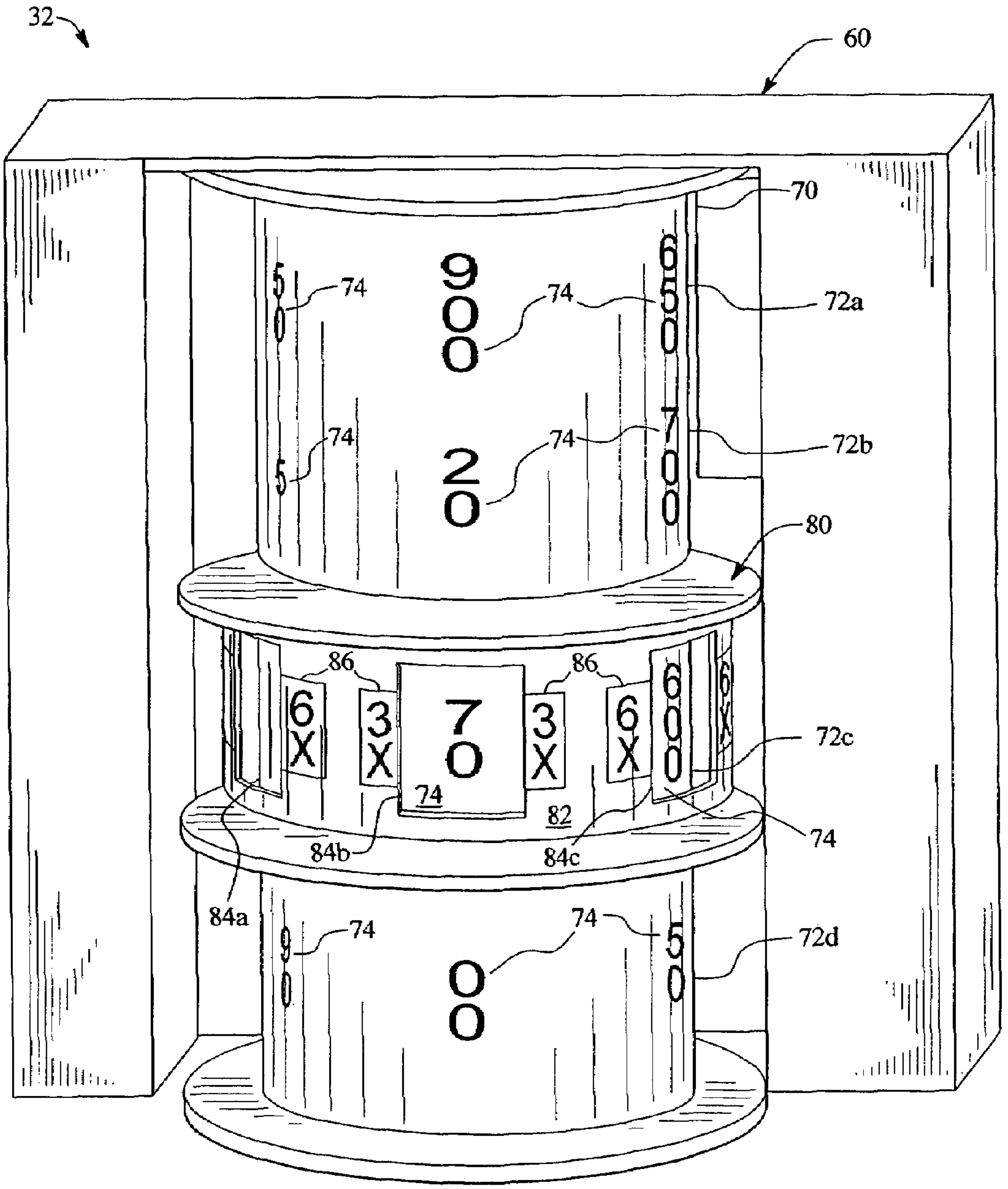
FIG. 3 is a perspective view of the upper display area illustrated in FIGS. 1A and 1B having one embodiment of the display device with concentric rotating displays of one embodiment of the present invention.

Referring now to FIG. 3, an enlarged perspective view of the upper display area 32 showing one embodiment of the display device of the present invention is illustrated. Each of the components described in FIG. 3 with respect to display device 60 is also found on display device 160 shown in FIG. 1B. Display device 160, however, is simulated on a video monitor 100. While one of the benefits of the present invention is to provide an electromechanical display device that cooperates, for example, with video monitor 30, the present invention contemplates creating outcomes or awards to the player via the same display shown on a video monitor. Indeed, current graphical programs provide very realistic three-dimensional displays that simulate and emulate the mechanical display device 60 and capture at least some of the exciting and entertaining features thereof.

Display device 60 of FIG. 3 is shown mounted to upper display area 32 in FIG. 1A. As discussed above, display device 60 is alternatively placed on top of the machine as a "topper", as that term is known in the art. Display device 60 includes a first or inner display 70 and a second or outer display 80. Inner display 70 includes generally an elongated cylinder, while outer display 80 in the illustrated embodiment includes a collar operable to rotate about the outside of inner display 70. The illustrated inner display 70 includes multiple rows 72*a* to 72*d* of symbols 74. Symbols 74, in one embodiment, are credit values, however, any type of symbol indicating a gain or benefit for the player can be used, such as a multiplier, a number of free spins, a number of free plays, an indication of a non-monetary award, a symbol that takes the player to a bonus game, and any combination thereof. In another embodiment, symbols 74 are displayed additionally with indicia, such as indicia similar to the symbols on the reels 34 of a slot base game, symbols related to a card-based game or keno game or indicia displayed in accordance with a theme of the present invention.

Symbols 74 are shown to be spread out in rings 72*a* to 72*d* evenly to provide in essence vertical columns of values. Alternatively, the rows 72*a* to 72*d* are staggered. Rows 72*a* to 72*d* can be stocked with symbols or values so as to create more and less valuable rows on average or be mixed so that one row is not advantageous with respect to another one of the rows. Still further, the rows 72*a* to 72*d* can have a same or different number of symbols or values. Although not illustrated, suitable lighting can be provided either around the outside of upper display area 32 to illuminate values 74 from the outside or from on the inside of display 70, so as to illuminate values 74 from within.

In operation, inner display 70 rotates in one or multiple directions. In one embodiment, display 70 does not translate. Outer display 80 as illustrated is a collar that fits relatively snugly about the outside of inner display 70. Collar 80 includes a surface 82 which is, in one embodiment, generally opaque, so that the player cannot see through surface 82 to view the awards 74 hidden behind surface 82 of display 80. Display 80, however, defines indicators such as viewing areas 84*a*, 84*b* and 84*c*, which each enable the player to look through the outer display 80 to see the symbol 74 of inner display 70. Viewing areas 84*a* to 84*c* are alternatively open apertures, windows translucent or transparent members or other types of apertures that enable the player to see through surface 82 of outer display 80.

The illustrated outer display 80 includes at least multiple viewing areas 84*a* to 84*c* (excluding the viewing areas not shown). The outer display could include more or less viewing areas. In the illustrated embodiment, outer display 80 associates a value or symbol 86 with each viewing area 84*a* to 84*c*. In the illustrated embodiment, symbols 86 are multipliers. In that manner, the player's outcome or award is the credit value 74 ultimately designated by outer display 80 multiplied by the symbol 86 associated with the viewing area that ultimately indicates or designates the symbol 74 of inner display 70. In one embodiment, the viewing area facing most closely towards the player, i.e., furthermost away from gaming device 10 when display 80 stops moving is the viewing area counted towards the player's outcome or award. As illustrated, the player wins seventy credits via symbol 74 designated by viewing area 84*b* multiplied by the 3× symbol 86 associated with viewing area 84*b*. That combination of symbols yields an outcome or award for the player of two hundred ten (e.g., two hundred ten credits credited to the player's credit meter).

As discussed above, displays 70 and 80 can move at the same or different times, individually or collectively. Displays 70 and 80 can move in the same direction or in different directions, at the same velocity or different velocities, and at the same acceleration or at different angular accelerations. At the same time, display 80 is adapted to translate up and down with respect to display 70, while display 80 rotates or does not rotate and while display 70 rotates or does not rotate. For example, it is contemplated that an outcome of the base game on video display 30 triggers the operation of mechanical display device 60 or simulated display device 100. Upon activation, each of the motions of the display moves. For example, inner display 70 turns in one direction while outer display 80 rotates in the same or opposite direction and at the same time moves up and down. This provides a fun and exciting display sequence to the player who can only hope that the viewing area 84 (collectively referring to viewing areas 84*a* through 84*c*) lands on or covers ultimately a relatively high valued symbol 74. Further, the player hopes that the viewing area 84 that indicates or designates the symbol 74 itself is associated with a relatively high valued symbol 86. The outer display 80 can change directions one or multiple times while translating relative to display 70, which itself can change directions one or multiple times. Displays 70 and 80 come to a stop eventually at the same or at different times. For example, display 70 could come to a stop, setting one column of values 74 for the player's award. Display 80 could then rotate to a final position, setting the multiplier or symbol 86 that the player ultimately receives. Thereafter, display 80 translates to a final position highlighting or indicating the symbol 74 of the designated column of symbols 74 of inner display device 70 that the player ultimately receives.

Figure 4:
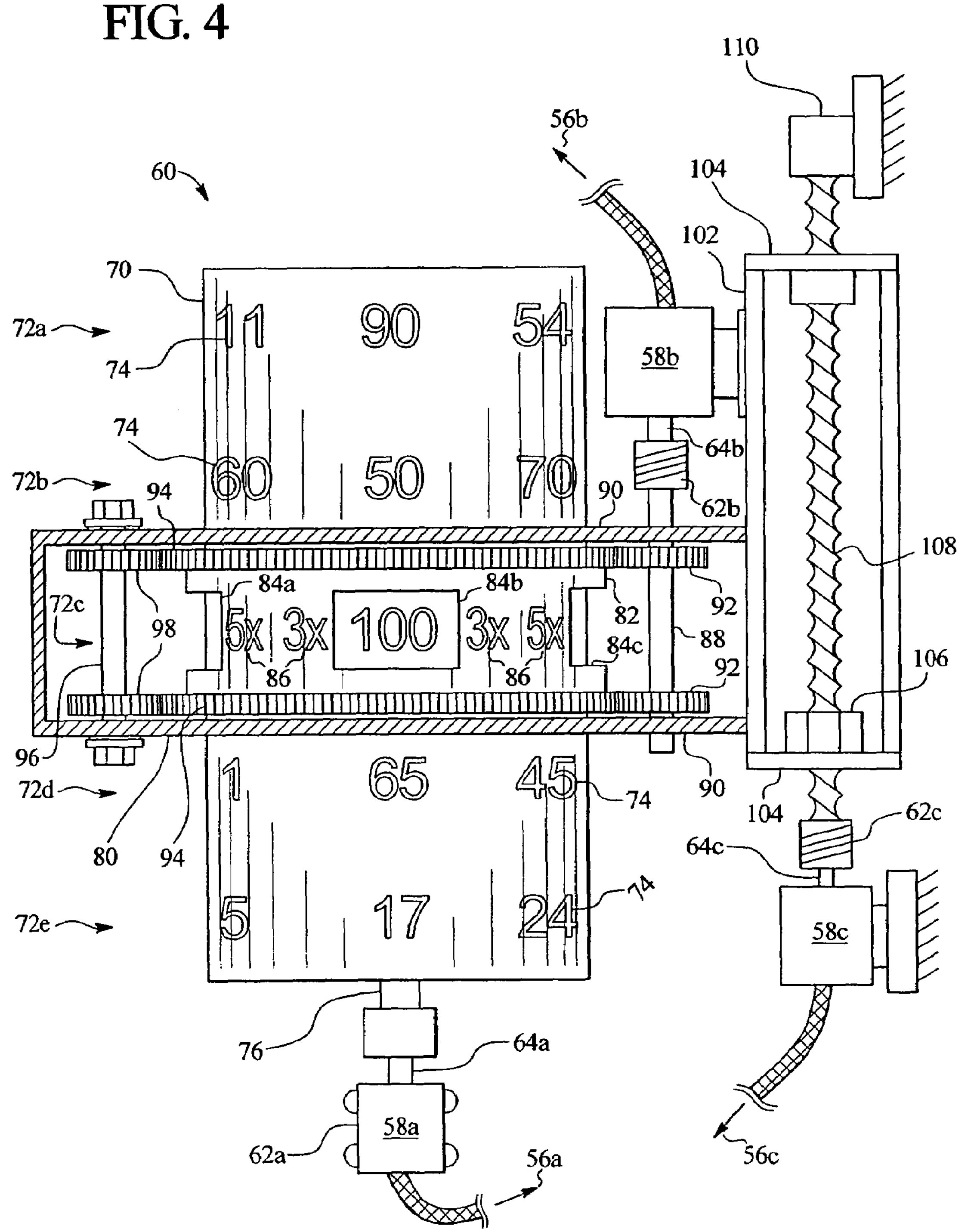
FIG. 4 is a perspective view of one embodiment of a motor configuration operable to produce the rotating and translating motion of one embodiment of the present invention.

Referring now to FIG. 4, one embodiment for producing the various motions of display device 60 is illustrated. Display device 60 illustrates many of the components illustrated in connection with FIG. 3, such as the inner display 70, showing symbols 74. Display 60 also includes outer display 80 having surface 82 defining viewing areas 84*a* to 84*c*, and displaying second symbols 86 in connection therewith. The symbols 74 of display 70 are also displayed in rows or rings 72*a* to 72*e*. Any suitable number of rings 72 (collectively referring to rings 72*a* to 72*e*, etc.) are possible.

Inner display 70 is coupled to a shaft 76, which in turn is coupled via a flex coupler 62*a* to an output shaft 64*a* of a motion producing device 58*a*. In the embodiment illustrated in FIG. 4, each of the motion producing devices 58 (referring collectively to devices 58*a*, 58*b* and 58*c*) is a stepper motor. 58*c* alternatively is a linear stepper motor or other type of linear actuator. Further, cables extending from motors 58*a* run as illustrated to motion controllers 56 (referring collectively to motion controllers 56*a* to 56*c*). In an alternative embodiment, those cables run to a single motion controller 56, which is operable to control a multitude of motion producing devices 58.

Although not illustrated, inner display 70 includes suitable apparatus that supports the display and prevents the display from tipping or otherwise moving an undesirable manner as the display rotates about shaft 76. Coupler 62*a* is flexible and accounts for slight misalignment between shafts 76 and 64*a*. Motor 58*a* rotates inner display 70 directly in the illustrated embodiment, however, suitable gears or gearing may be used alternatively.

Outer display 80 is driven by motion producing device or stepper motor 58*b*. Output shaft 64*b* of motor 58*b* is coupled via flex coupler 62*b* to a shaft 88. Shaft 88 extends through multiple sides of a mount 90. Inside mount 90, gears 92 are affixed to shaft 88. Gears 92 in turn drive mating gears 94 provided on the upper and lower ends of outer display 80. Thus, when output shaft 64*b* of motor 58*b* turns, shaft 88 also turns, so that gears 92 affixed to shaft 88 rotate and cause gears 94 of outer display 80 to rotate, rotating display 80 accordingly.

On the opposite end of display 80 from shaft 88 is a shaft 96, which is coupled to gears 98. Gears 98 in turn mate with gears 94 on the opposite end of display 80 from gears 92. The combination of gears 92 and 98 coupled to shafts 88 and 96, respectively, which are affixed horizontally, holds outer display 80 in horizontal position relative to inner display 70. Mount 90 supports display 80 vertically. The combination of gears 92 and 98 also enables display 80 to rotate substantially concentrically with the rotation of inner display 70. Shaft 96 is held in place with respect to mount 90 via suitable hardware, such as nuts and washers.

Motor 58*b* and mount 90 are both affixed (via, e.g., welds or suitable fasteners) to moving member 102. Moving member 102 in an embodiment is square or U-shaped tubing that has caps 104 welded at either end. At one or both caps, a threaded nut or threaded portion 106 is welded. A threaded shaft 108 threads through nut 106 and couples at either end to a flex coupler 62*c* and a bearing 110. Bearing 110 is affixed to the frame of gaming device 10 as is motor 58*c*. Output shaft 64*c* couples to threaded shaft 108 via flex coupler 62*c*.

The rotation of stepper motor 58*c* is converted via moving member 102 to a translational motion, which in turn translates stepper motor 58*b*, mount 90 and outer display 80, which is carried by mount 90. Mount 90, in an embodiment, is relatively thin so as to appear to the player to be part of outer display 80. Upper display area 32 also includes other masking or camoflauging apparatus that hide the mechanical workings of display device 60, so that the player only sees inner display 70 and outer display 80. The sizing of moving member 102 and the length of threaded shaft 108 are selected so that outer member 80 can translate the full length of inner display 70. Although not illustrated, hard limit switches can be placed so that moving member 102 triggers such switches if outer member 80 translates too far up or down with respect to inner display 70.

It should be appreciated that the display device of the present invention can be positioned horizontally instead of vertically as illustrated, or at any suitable angle or position.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operable under control of at least one processor, said gaming device comprising:

a game controlled by the processor and operable upon a wager by a player;

a cabinet; and a display controlled by the processor, connected to the cabinet and operable to indicate an outcome after an occurrence of a triggering event associated with the game, the display including:

(i) a first symbol display having an axis of rotation and operable to rotate substantially about the axis of rotation, the first symbol display including a plurality of symbols, and (ii) a second symbol display arranged concentrically with and exterior to the first symbol display, said second symbol display operable to rotate relative to the axis of rotation of the first symbol display, the second symbol display operable to translate substantially along the axis of rotation of the first symbol display, the second symbol display including at least one viewing area through which at least one symbol of the first symbol display can be selectively viewed, wherein the outcome is based on the position of the first symbol display relative to the position of the second symbol display after the first symbol display and the second symbol display have stopped moving.

2. The gaming device of claim 1, wherein the first symbol display includes an elongated body.

3. The gaming device of claim 1, wherein the first symbol display includes a plurality of groups of symbols.

4. The gaming device of claim 3, wherein the first symbol display includes a single member displaying said groups of symbols.

5. The gaming device of claim 3, wherein the second symbol display is operable to translate relative to the first symbol display to be able to designate one of the symbols from one of the groups of symbols of the first symbol display.

6. The gaming device of claim 5, wherein the first symbol display includes a single member displaying said groups of symbols.

7. The gaming device of claim 1, wherein the outcome is of the game.

8. A gaming device operable under control of at least one processor, said gaming device comprising:

a game controlled by the processor and operable upon a wager by a player;

a cabinet;

at least one substantially cylindrical first symbol display controlled by the processor, said first symbol display:

(a) having an axis of rotation and operable to rotate substantially about the axis of rotation, and (b) having a plurality of groups of symbols, each group including a plurality of symbols; and at least one substantially cylindrical second symbol display controlled by the processor, said second symbol display:

(i) positioned substantially concentrically with the first symbol display, (ii) positioned exterior to the first symbol display, (iii) operable through a motion producing device to move substantially along the axis of rotation of the first symbol display such that the second symbol display moves relative to at least a portion of the first symbol display, (iv) operable to rotate substantially about the first symbol display, (v) having at least one viewing area, and (vi) having at least one symbol; and a plurality of outcomes, wherein at least one of the outcomes is based on at least one of the symbols of one of the groups displayed through the viewing area of the second symbol display when the second symbol display stops moving along and rotating about the axis of rotation and the first symbol display stops rotating about the axis of rotation.

9. The gaming device of claim 8, wherein the first symbol display includes an elongated body.

10. The gaming device of claim 8, wherein the first symbol display includes a single member displaying said groups of symbols.

11. The gaming device of claim 8, wherein the outcomes are of the game.

12. A method of operating a gaming device having a game operable on a wager, the method comprising:

providing a substantially cylindrical first symbol display
(i) having an axis of rotation and operable to rotate substantially about the axis of rotation, and
(ii) having a plurality of groups of symbols, each group including a plurality of symbols; and providing at least one substantially cylindrical second symbol display controlled by the processor, said second symbol display:
(i) positioned substantially concentrically with the first symbol display,
(ii) positioned exterior to the first symbol display,
(iii) operable to move substantially along the axis of rotation of the first symbol display such that the second symbol display moves relative to at least a portion of the first symbol display,
(iv) operable to rotate substantially about the first symbol display,
(v) having at least one viewing area, and
(vi) having at least one symbol; and moving the second symbol display along the axis of rotation of the first symbol display and stopping the movement of the second symbol display in alignment with one of the groups of symbols;

rotating the first symbol display and stopping the rotation of the first symbol display;

rotating the second symbol display and stopping the rotation of the second symbol display; and providing one of a plurality of outcomes, wherein at least one of the outcomes is based on at least one of the symbols of one of the groups displayed through the viewing area of the second symbol display.

13. The method of claim 12, wherein the first symbol display includes an elongated body.

14. The method of claim 12, wherein the first display includes a single member displaying said groups of symbols.

15. The method of claim 12, wherein the outcomes are of the game.

16. A gaming device operable under control of at least one processor, said gaming device comprising:

a game controlled by the processor and operable upon a wager by a player;

a cabinet; and a display controlled by the processor, connected to the cabinet and operable to indicate an outcome after an occurrence of a triggering event associated with the game, the display including:

(i) a first symbol display having an axis of rotation and operable to rotate substantially about the axis of rotation, the first symbol display including a plurality of symbols, and (ii) a second symbol display arranged concentrically with and exterior to the first symbol display, said second symbol display operable to rotate relative to the axis of rotation of the first symbol display, the second symbol display operable to translate substantially along the axis of rotation of the first symbol display, the second symbol display including at least one viewing area through which at least one symbol of the first symbol display can be selectively viewed, wherein the outcome is based on the position of the first symbol display relative to the position of the second symbol display after the first symbol display and the second symbol display have stopped moving, and wherein the second symbol display is operable to translate relative to the first symbol display to be able designate one of the symbols from one of the groups of the first symbol display.

17. The gaming device of claim 16, wherein the first symbol display includes a single member displaying said groups of symbols.

* * * * *